Patented Jan. 14, 1930

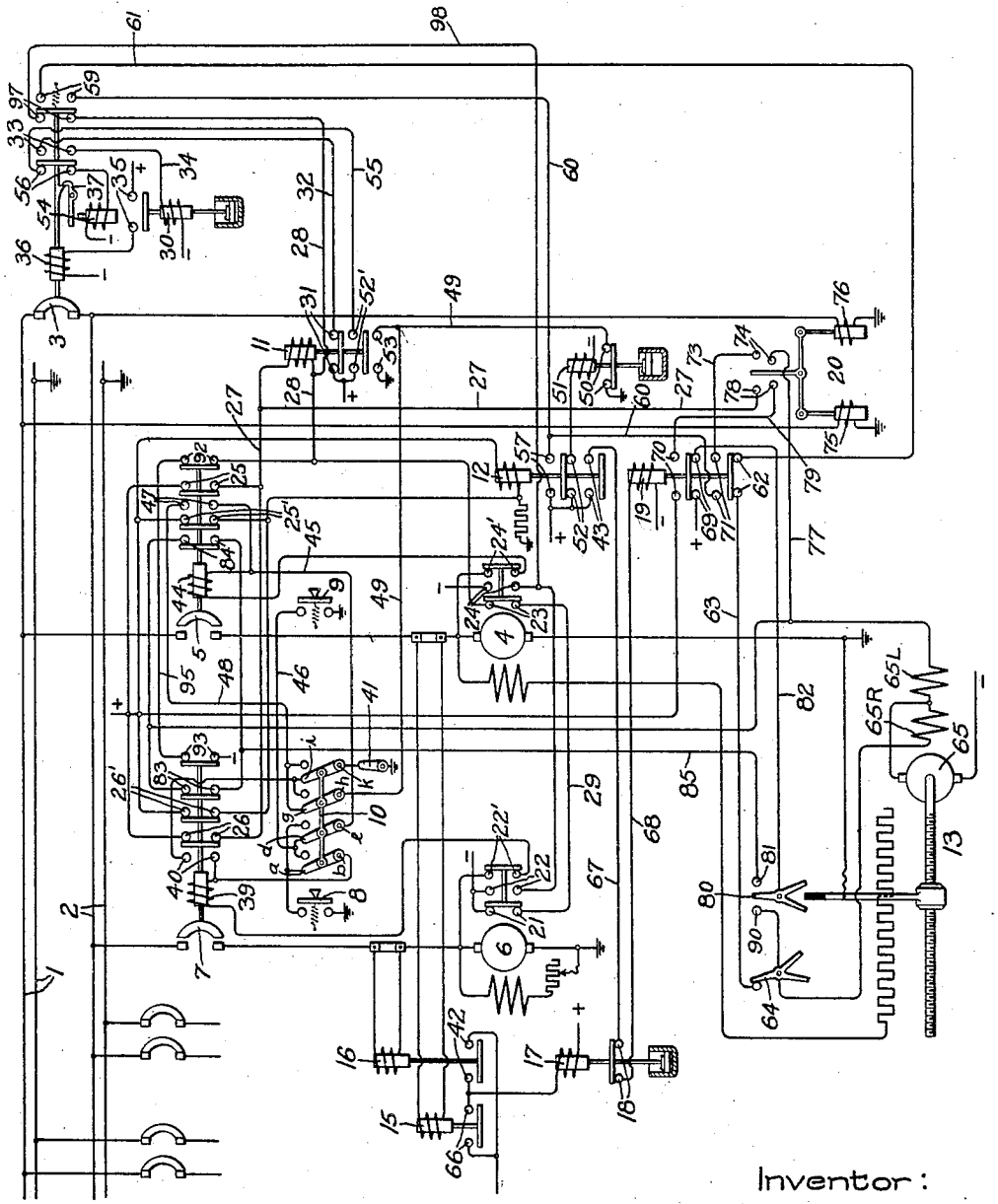

1,743,771

UNITED STATES PATENT OFFICE

EDWARD H. HALL, OF SCHENECTADY, NEW YORK, ASSIGNOR TO GENERAL ELECTRIC COMPANY, A CORPORATION OF NEW YORK

SYSTEM OF ELECTRIC DISTRIBUTION

Application filed March 25, 1926, Serial No. 97,443. Renewed January 22, 1929.

My invention relates to systems of electric distribution and particularly to an automatic switching arrangement for controlling the connections between a plurality of sources and a plurality of distribution circuits.

My invention is of particular utility in stations which supply load centers located at different distances therefrom. In order that substantially the same voltage may be available at each load center, it is customary to have them supplied from different busses which are separately energized and which are maintained at different voltages. Under light load conditions, however, it is sometimes desirable to connect two or more of these busses together and supply them at a predetermined voltage from a smaller number of sources.

One object of my invention is to provide an automatic switching and regulating equipment for a plurality of sources whereby under certain conditions a plurality of distribution circuits are connected together and supplied at a predetermined voltage by certain of the sources and whereby under certain other conditions the circuits are disconnected from each other and are independently energized at different voltages.

My invention will be better understood from the following description taken in connection with the accompanying drawing and its scope will be pointed out in the appended claims.

Referring to the accompanying drawing which shows diagrammatically a system of electric distribution embodying my invention, 1 and 2 represent two distribution busses which are adapted to be connected together by a tie breaker 3 of any suitable type, examples of which are well known in the art. Each bus is adapted to be supplied by one or more separate sources of current so that the busses, when disconnected from each other, may be operated at different voltages. As shown in the drawing, the separate source for the bus 1 is a generator 4 which is adapted to be connected to the bus 1 by means of a circuit breaker 5, and the separate source for the bus 2 is a generator 6 which is adapted to be connected to the bus 2 by means of a circuit breaker 7. The circuit breakers 5 and 7 may be of any suitable type.

8 and 9, which are shown here as manually operated switches, represent master starting elements for controlling the closing of the circuit breakers 5 and 7. The switch 8 is closed when both breakers are open, and it is desired to connect one of the generators to its respective bus and the switch 9 is subsequently closed when one of the generators is supplying current to its respective bus and it is desired to connect the other generator to its respective bus. While the switches 8 and 9 are shown as manually operated switches, it is evident that they may be automatic switches of any suitable type and may be controlled automatically in response to various conditions in a manner well known in the art.

10 is a changeover switch which determines, by its position, the sequence in which the circuit breakers 5 and 7 close when the master elements 8 and 9 are successively closed. When the changeover switch 10 is in the position shown in the drawing, the closing of the master element 8 effects the closing of the circuit breaker 7 and the subsequent closing of the master element 9 effects the closing of the circuit breaker 5. Therefore, the generator 6 is the leading machine and the generator 4 is the trailing machine. When the changeover switch 10 occupies its other position, the closing of the master element 8 effects the closing of the circuit breaker 5 and the subsequent closing of the master element 9 effects the closing of the circuit breaker 7. Therefore, when the changeover switch is in this other position, the generator 4 is the leading machine and the generator 6 is the trailing machine.

In order to simplify the drawing, I have shown the master elements 8 and 9 as directly controlling the closing circuits of the circuit breakers 5 and 7. In actual practice, however, the master elements may control automatic switching means of any suitable type whereby the generators 4 and 6 are automatically started from rest and brought to a predetermined condition before the circuit breakers are closed. Examples of such switching equipments are well known in the art.

When both of the circuit breakers 5 and 7 are closed so that each bus is energized by its respective generator, it is desirable to disconnect the two busses from each other so that the voltage of one may be varied with respect to the other. For accomplishing this result, a control relay 11 is provided which operates when both circuit breakers are closed to effect the opening of the tie breaker 3.

When both of the circuit breakers 5 and 7 are closed, another relay 12 operates to cause a motor operated rheostat 13 in the field circuit of the generator 4 to increase the excitation of the generator 4 to a predetermined value so that the voltage of the bus 1 is increased to a predetermined voltage. Therefore, when the two busses are disconnected from each other, they are operated at different voltages.

When the loads connected to the two separate busses decrease so that they can be supplied by one generator without overloading the machine, it is desirable to reconnect the two busses together and disconnect the trailing machine from its respective bus. Before this can be done, however, it is necessary to equalize the voltages of the two busses.

As shown in the drawing, the trailing machine is arranged to be disconnected when the output of each generator is below a predetermined value. 15 represents a current relay responsive to the current output of the generator 4, and 16 represents a current relay responsive to the current output of the generator 6. Both of these relays jointly control the circuit of a time relay 17 so that the relay maintains its contacts 18 open so long as the output of either generator is above a predetermined value. When the relay 17 closes its contacts 18, a circuit is completed for the master stopping relay 19 if both of the circuit breakers 5 and 7 are closed. The master stopping relay 19 in turn effects the completion of a lowering circuit for the motor operated rheostat 13 in the field circuit of the generator 4 to reduce the voltage of the bus 1 to the voltage of the bus 2. When the voltages of the two busses are substantially equal the balanced relay 20, which is responsive to the relative voltages of the two busses, effects the opening of the lowering circuit and the operation of the motor operated rheostat which in turn effects the closing of the tie breaker 3 and the disconnection of the trailing machine from its respective bus.

21, 22 and 22' represent contacts controlled by suitable protective devices (not shown) which operate in response to predetermined abnormal conditions of the apparatus or circuits associated with the generator 6 and contacts 23, 24 and 24' represent similar contacts controlled by protective devices associated with the generator 4. The contacts 21, 22', 23 and 24' are adapted to be opened and the contacts 22 and 24 are adapted to be closed when an abnormal condition occurs in the apparatus or circuits of the associated generators. These contacts control the opening and closing of the breakers 3, 5 and 7 in a manner herein after described.

The operation of the arrangement shown in the drawing is as follows: When both of the circuit breakers 5 and 7 are open so that both of the generators are disconnected from their respective busses, the coil of relay 12 is short-circuited by the contacts 25' and 26' on the circuit breakers 5 and 7 respectively. A circuit, however, is completed for the control relay 11 to effect the closing of the tie breaker 3 if it is open. The circuit of the control relay 11 is from the positive side of a suitable control circuit, through the auxiliary contacts 25 and 26 on the circuit breakers 5 and 7 respectively, these auxiliary contacts being connected in parallel and closed when the respective breakers are open, conductor 27, coil of relay 11, conductor 28, protective contacts 23, conductor 29, protective contacts 21 to the negative side of the control circuit. The control relay 11 is energized, therefore, whenever both machines are in an operative condition and either the circuit breaker 5 or 7 is open. When the control relay 11 is energized, a circuit is completed for the hesitating control relay 30 associated with the tie breakers 3 if the tie breaker is open. The circuit of the control relay 30 is from the positive side of the control circuit through the contacts 31 of the relay 11, conductor 32, auxiliary contacts 33 on the tie breaker 3, which are closed when the breaker is open, conductor 34, coil of relay 30 to the negative side of the control circuit. The closing of the contacts 35 of the control relay 30 completes the circuit of the closing coil 36 of the tie breaker. The breaker 3 is held in its closed position by a latch 37. The opening of the auxiliary contacts 33, when the tie breaker 3 closes, effects the deenergization of the relay 30, which in turn opens the circuit of the closing coil 36.

When conditions are such that it is desirable to have one of the generators supply current to the two circuits 1 and 2, the change-over switch 10 is placed in the proper position to make the machine to be put into operation the leading machine and then the master starting element 8 is closed for a short time. It will be assumed for the purpose of this description that the changeover switch 10 occupies the position shown in the drawing when the master starting element 8 is closed so that the generator 6 is the leading machine.

The closing of the starting element 8 completes a circuit for the closing coil 39 of the circuit breaker 7 so that the generator 6 is connected to the bus 2. This circuit is from the ungrounded side of the generator 6 through protective contacts 22', the closing coil 39, contacts b and a of the changeover switch 10, starting element 8 to the grounded side of the generator 6.

The circuit breaker 7, in closing, completes a locking circuit for its closing coil 39 so that the master starting element 8 may be opened. This locking circuit includes the auxiliary contacts 40 on the circuit breaker 7, contacts l and k of the changeover switch 10 and the contacts of a stopping switch 41 which is opened when it is desired to disconnect the leading machine from its respective bus.

As soon as the generator 6 is connected to the bus 2 the relay 16 closes its contacts 42 if the output of the generator is above a predetermined value. The closing of the contacts 42 completes the circuit of the time relay 17 which picks up and opens its contacts 18 instantly. The operation of the relay 17 is delayed when it is deenergized. The opening of these contacts does not effect the operation of another device at this time, as the circuit which is controlled thereby is also open at the contacts 43 of the relay 12 which, as above described, is deenergized so long as either circuit breaker 5 or 7 is open.

Since the tie breaker 3 is closed, the generator 4 supplies current to both busses.

The connection of the trailing generator 4 to the bus 1 is effected by momentarily closing the master starting element 9 which completes an energizing circuit for the closing coil 44 of the circuit breaker 5. This energizing circuit is from the ungrounded side of the generator 4, through protective contacts 24', the closing coil 44, conductor 45, contacts e and d of the changeover switch 10, conductor 46, master starting element 9 to the grounded side of the generator. The circuit breaker 5 in closing completes a locking circuit for its closing coil which includes the auxiliary contacts 47 on the circuit breaker 5, conductor 48, contacts g and h of the changeover switch 10, conductor 49, and contacts 50 of a control relay 51 which is energized so long as the relay 12 is in the position shown. The circuit of the relay 51 is from the positive side of a suitable control circuit through contacts 52 of the relay 12, coil of relay 51 to the negative side of the control circuit. The control relay 51 is a time delay relay which does not open its contacts 50 until after the relay has been deenergized a predetermined length of time, and its function is to maintain the locking circuit of the closing coil 44 completed until after the relay 11 completes in a manner hereinafter described, another locking circuit for the closing coil 44, when both circuit breakers 5 and 7 are closed. When both of these circuit breakers are closed the heretofore described circuit for the relay 11 is opened so that this relay opens its contacts 31 and closes its contacts 52' and 53. The contacts 53 complete a parallel path around the contacts 50 of the relay 51 so that the closing coil 43 remains energized after the relay 51 opens its contacts 50.

The closing of the contacts 52' of the relay 11 completes a circuit for the trip coil 54 of the breaker to disconnect the busses 1 and 2 from each other. This circuit is from the positive side of the control circuit, through contacts 52', conductor 55, auxiliary contacts 56 on the tie breaker 3, trip coil 54 to the negative side of the control circuit.

When both of the circuit breakers 5 and 7 are closed, the relay 12, whose coil is short circuited by the auxiliary contacts 25' on the circuit breaker 5 when it is open and by the auxiliary contacts 26' on the circuit breaker 7 when it is open, is energized so that it opens its contacts 52 and closes its contacts 43 and 57.

The closing of the contacts 43 has no effect at this time as the circuit controlled thereby is already open at the contacts 18 of the relay 17 as above described.

The opening of the contacts 52 deenergizes the relay 51 which in turn opens its contacts 50 after a time delay.

The closing of the contacts 57 and the closing of the auxiliary contacts 59 on the breaker 3, which are closed when the tie breaker is open, effects the completion of a raising circuit for the motor operated rheostat 13 in the field circuit of the generator 4 so that the amount of resistance in the generator field circuit is decreased to a predetermined value whereby the voltage of the bus 1 is increased to a predetermined value. This raising circuit is from the positive side of a control circuit, through contacts 57 of the relay 12, conductor 60, auxiliary contacts 59 on the tie breaker 3, conductor 61, contacts 62 of the relay 19, conductor 63, limit switch 64 on the rheostat, field winding 65R and armature winding of the motor 65 of the rheostat to the negative side of the control circuit. The limit switch 64 is set so that it is opened when there is the proper amount of the rheostat resistance in the field circuit to give the desired voltage across the bus 1. It will be observed, therefore, that after the second machine is connected to its respective bus, the voltage of bus 1 is automatically increased to a higher value. This bus, therefore, may be used to supply current to loads situated farther away from the station than the loads connected to the bus 2.

As soon as the circuit breaker 5 is closed, the relay 15 picks up and closes its contacts 66, which are in parallel with contacts 42 in the circuit of the relay 17, when the output of the generator 4 is above a predetermined value.

In the arrangement shown in the drawing, the sources continue to supply their respective busses at different voltages so long as the output of each machine is above a predetermined value. When, however, the output of each machine is below a predetermined value, so that the contacts of both of the relays 15 and 16 are open, the relay 17 is deenergized and the closing of its contacts 18 effects the connection of the two busses together after the voltage of the generator 4 has been reduced to a value substantially equal to the voltage of the generator 6, and effects the disconnection of the trailing machine from its respective bus.

The closing of the contacts 18 of the relay 17, which are not closed until after the relay coil has been deenergized for a certain length of time so as to prevent the trailing machine being disconnected in response to a momentary light load on both busses, completes a circuit for the relay 19 from the positive side of a control circuit through contacts 43 of the relay 12, conductor 67, contacts 18 of relay 17, conductor 68, coil of relay 19 to the negative side of the control circuit. The relay 19 opens its contacts 62 and 69 and closes its contacts 70 and 71.

The opening of the contacts 62 opens the heretofore described raising circuit for the motor operated rheostat 13 and the closing of the contacts 71 completes a lowering circuit for the rheostat so as to decrease the voltage of the generator 4 to the voltage of the generator 6. This lowering circuit is from the positive side of a control circuit, through contacts 57 of relay 12, conductor 60, contacts 71 of the relay 19, conductor 73, contacts 74 of the balanced relay 20 which has its coils 75 and 76 respectively connected across the busses 1 and 2, conductor 77, field winding 65L and armature winding of the motor 65 to the negative side of the control circuit. The motor 65 operates to insert resistance in the field circuit of the generator 4, thereby reducing the voltage thereof. When the generator voltage has been reduced sufficiently so that the voltage of the two busses are substantially equal, the balance relay 20 operates to open its contacts 74, which are closed when the voltage of bus 2 is higher than the voltage of bus 1, and closes its contacts 78 to effect the closing of the tie breaker 3. The opening of the contacts 74 opens the above traced lowering circuit for the motor operated rheostat 13.

The closing of the contacts 78 completes a circuit for the relay 11 from the positive side of a control circuit, through contacts 70 of the relay 19, conductor 79, contacts 78 of the relay 20, conductor 27, coil of relay 11, conductor 28, protective contacts 23, conductor 29, protective contacts 21 to the negative side of the control circuit.

The closing of the contacts 31 of the relay 11 completes the heretofore described circuit for the hesitating control relay 30 which in turn completes the circuit of the closing coil 36 to close the tie breaker 3.

The opening of the contacts 53 of the relay 11 opens the heretofore traced holding circuit for the closing coil 43 of the circuit breaker 5 so that the generator 4 is disconnected from the bus 1. Usually in practice the circuit breakers 3, 5 and 7 are such that the time it takes the tie breaker 3 to close is less than the time it takes the breaker 5 or 7 to open so that the tie breaker 3 is closed before the trailing machine is disconnected.

As soon as the auxiliary contacts 25' on the circuit breaker 5 are closed, the coil of the relay 12 is short circuited so that it opens its contacts 43 and 57 and closes its contacts 52 to energize the relay 51, which in turn closes its contacts 50. The opening of the contacts 43 deenergizes the relay 19 so that it opens its contacts 70 and 71 and closes its contacts 62 and 69.

The opening of the contacts 70 opens the above traced circuit for the relay 11, but the closing of the auxiliary contacts 25 on the circuit breaker 5 before the contacts 70 open completes another circuit therefor which has been traced heretofore so that the relay 11 remains energized. The opening of the contacts 71 prevents the above traced raising circuit from being closed when the contacts 74 of the balance relay are closed until the load on each machine is below a predetermined value.

The closing of the contacts 69 completes a circuit for the motor 65 of the motor operated rheostat 13 so that the excitation of the generator 4 is adjusted to give the voltage which it is desired to maintain across bus 2. This arrangement is especially desirable when the generator 4 is the leading machine, since the voltage of this machine may be above or below the desired value at the time the trailing machine is disconnected from its respective circuit.

If the rheostat is in a position such that the excitation is too great, the limit switch contacts 80 and 81 are closed, and a lowering circuit for the motor 65 is completed when the contacts 69 close. This circuit is from the positive side of a control circuit, through contacts 69, conductor 82, limit switch contacts 80 and 81, conductor 85, auxiliary contacts 83 or 84 on the circuit breakers 7 and 5 respectively, these contacts being in parallel and closed when the respective circuit breakers are open, conductor 77, field winding 65L and armature winding of the motor 65 to the negative side of the control circuit. Resistance is inserted in the field circuit until the movable arm of the rheostat has reached the position to give the proper generator voltage. When the rheostat is in this position, the contacts 80 and 81 are open.

If the rheostat is in a position so that the generator excitation is too small to maintain the desired voltage, the limit switch contacts 80 and 90 are closed and the closing of the contacts 69 completes a raising circuit for the motor 65. This circuit is from the positive side of a control circuit, through contacts 69 of the relay 19, conductor 82, limit switch contacts 80 and 90, field winding 65R and armature winding of the motor 65 to the negative side of the control circuit. Resistance is cut out of the field circuit until the rheostat arm has reached the position to give the proper generator voltage. When the rheostat is in this position, the contacts 80 and 90 are open.

The leading generator 6 is disconnected by opening the stop switch 41 which opens the circuit of the closing coil 39 of the circuit breaker 7.

It is evident from the drawing that when the changeover switch is in its other position, the closing and opening of the circuit breaker 5 is controlled respectively by the master starting element 8 and the stop switch 41 and closing and opening of the circuit breaker 7 is controlled respectively by the master starting element 9 and the current relays 15 and 16.

It will be observed that the circuit of the relay 11 includes the protective contacts 23 and 21 so that if either machine or its associated control apparatus is rendered inoperative when both sources are in operation, the relay 11 is not energized to effect the closing of the tie breaker when the defective machine is disconnected. This feature prevents an abnormal condition on one of the busses from being connected to the other bus and rendering its sources inoperative. The tie breaker remains open until both of the circuit breakers 5 and 7 are open when a circuit therefor is completed through auxiliary contacts 92 and 93 on the circuit breakers 5 and 7 respectively. This circuit is from the positive side of the control circuit through auxiliary contacts 25 and 26 on the circuit breakers 5 and 7 in parallel, conductor 27, coil of relay 11, conductor 28, auxiliary contacts 92 on circuit breaker 5, conductor 95, auxiliary contacts 93 of circuit breaker 7 to the negative side of the control circuit. After the tie breaker 3 closes, a circuit for the relay 11 is completed if either of the generators is in an inoperative condition, this circuit being from the coil of the relay 11 through conductor 28, auxiliary contacts 97 on the tie breaker 3, conductor 98, to the negative side of the control circuit through either protective contacts 24 or protective contacts 22, depending upon which generator is inoperative. Therefore, after the two busses are connected together, they remain connected together so long as either machine is in an operative condition.

While I have, in accordance with the patent statutes, shown and described my invention as applied to a particular system and as embodying various devices diagrammatically indicated, changes and modifications will be obvious to those skilled in the art, and I, therefore, aim in the appended claims, to cover all such changes and modifications as fall within the true spirit and scope of my invention.

What I claim as new and desire to secure by Letters Patent of the United States, is:

1. In a system of electric distribution, two electric circuits connected together, a source of current for each circuit, means for connecting each source to its respective circuit, and means for automatically disconnecting the two electric circuits from each other and effecting a predetermined change in the voltage of one of said sources when both sources are connected to their respective circuits.

2. In a system of electric distribution, two electric circuits connected together, a dynamo electric machine for supplying current to each of said circuits, switching means for connecting each machine to its respective circuit, and means controlled by said switching means for effecting the disconnection of the two circuits from each other and for increasing the voltage of one of said generators to a predetermined value.

3. In a system of electric distribution, two electric circuits connected together, a source of current for each circuit, switching means for connecting each source to its respective circuit, disconnecting means arranged to be operated to disconnect said circuits from each other when both of said sources are connected to their respective circuits, and means controlled by said disconnecting means for adjusting the voltage of one of said sources to a predetermined value when both of said circuits are disconnected from each other.

4. In a system of electric distribution, two electric circuits connected together, a separate dynamo electric machine for supplying current to each circuit, switching means for connecting each machine to its respective circuit, disconnecting means controlled by said switching means for disconnecting said circuits from each other when both of said machines are connected to their respective circuits, and additional means controlled by said switching means for adjusting the excitation of one of said machines to a predetermined value when both of said machines are connected to their separate circuits.

5. In a system of electric distribution, two electric circuits connected together, a separate generator adapted to be connected to each circuit, switching means for connecting each generator to its respective circuit, means for disconnecting said circuits from each other when both of said machines are connected to their respective circuits, and a motor operated rheostat in the field circuit of one of said generators arranged to be operated in response to the operation of said disconnecting means to increase the excitation of said one of said generators to a predetermined value.

6. In a system of electric distribution, two electric circuits, a source of current connected to one of said circuits and supplying current thereto at a predetermined voltage, another source of current connected to the other of said circuits and supplying current thereto at another predetermined voltage, and means for disconnecting one of said sources from its respective circuits comprising means for equalizing the voltages of said circuits, and means controlled by the voltages of the two circuits for connecting the two circuits together and disconnecting the desired source from its respective circuit.

7. In a system of electric distribution, two electric circuits, a dynamo electric machine connected to one of said circuits and supplying current thereto at predetermined voltages, another dynamo electric machine connected to the other of said circuits and supplying current thereto at a different voltage, and means for disconnecting one of said machines from its respective circuit comprising means for varying the voltage of one of said machines to a value substantially equal to the voltage of the other machine and means arranged to operate when the voltages of the two machines are substantially equal to effect the connection of said electric circuits together and the disconnection of the desired machine from its respective circuit.

8. In a system of electric distribution, two electric circuits, a generator connected to one of said circuits and supplying current thereto at a predetermined voltage, another generator connected to the other circuit and supplying current thereto at a higher voltage, a control device adapted to be operated when it is desired to effect the disconnection of one of said generators from its respective circuit, regulating means for one of said generators arranged to be controlled by said control device whereby the voltage of said last-mentioned generator is varied to a value substantially equal to the other generator, and means arranged to operate when the voltages of the two generators are substantially equal to effect the connection of the two electric circuits together and the disconnection of the desired generator from its respective circuit.

9. In a system of electric distribution, two electric circuits, a source of current connected to one of said circuits and supplying current thereto at a predetermined voltage, a generator connected to the other circuit and supplying current thereto at a higher voltage, a motor operated rheostat in the field circuit of said generator, control means for effecting the operation of said motor operated rheostat to decrease the voltage of said generator, and a differential relay having coils respectively responsive to the voltages of said source and generator for effecting the connection of said circuits together and the disconnection of said generator from its respective circuit when the voltages of said source and generator are substantially equal.

10. In a system of electric distribution, two electric circuits, a generator connected to one of said circuits and supplying current thereto at a predetermined voltage, another generator connected to the other circuit and supplying current thereto at a higher voltage, a motor operated rheostat in the field circuit of said last-mentioned generator, control means for completing a lowering circuit for said motor operated rheostat, and a balance relay having coils respectively responsive to the voltages of the two generators for effecting the opening of the lowering circuit of said rheostat, the connection of said circuits together, and the disconnection of a predetermined one of said generators from its respective circuit when the voltages of said generators are equal.

11. In a system of electric distribution, two electric circuits, a source of current connected to each circuit, control means adapted to be operated to effect the disconnection of one of said circuits from its respective source, connecting means arranged to be operated in response to the operation of said control means to connect said electric circuits together, and protective means arranged to be operated in response to a predetermined abnormal condition of one of said sources to prevent the connection of said circuits together by said connecting means in response to the operation of said control means.

12. In a system of electric distribution, two electric circuits, a source of current connected to each circuit, control means adapted to be operated to effect the disconnection of one of said circuits from its respective source, connecting means arranged to be operated in response to the operation of said control means to connect said electric circuits together, protective means arranged to be operated in response to a predetermined abnormal condition of one of said sources to remove the control of said connecting means from said control means, and means for effecting the operation of said connecting means irrespectively of said protective means when both of said sources are disconnected from their respective circuits.

13. In a system of electric distribution, two electric circuits, means for connecting said circuits together, a source of current connected to one of said circuits, control means adapted to be operated to effect the disconnection of said source from said one of said circuits and the operation of said connecting means to connect said circuits together, and other control means controlled by a predetermined condition of said source for effecting the disconnection of said source from said one of said circuits and for rendering said connecting means inoperative to connect said circuits together.

14. In a system of electric distribution, two electric circuits, switching means for connecting said circuits together, a source of current connected to one of said circuits, control means for effecting the disconnection of said source from said one of said circuits, means for effecting the operation of said switching means to connect said circuits together when said source is disconnected from said one of said circuits and protective means associated with said source for effecting the disconnection of said source from said one of said circuits and for rendering said switching means unresponsive to the disconnection of said source.

15. In an electrical system, the combination with two bus sections, connecting means therebetween, a load circuit connected to each bus section, a supply circuit for each bus section, and connecting means between each supply circuit and the corresponding bus section, of means for maintaining the connecting means between the two bus sections and the connecting means between one of the supply circuits and the corresponding bus section effective, and for maintaining the connecting means between the other supply circuit and bus section ineffective while the voltage across one of the load circuits is above a predetermined value and the total power demand of the two load circuits is below a predetermined value.

16. In an electrical system, the combination with two bus sections, connecting means therebetween, a load circuit connected to each bus section, a supply circuit for each bus section and connecting means between each supply circuit and the corresponding bus section, of means for maintaining the connecting means between the two bus sections ineffective and the connecting means between each of the supply circuits and the corresponding bus section effective while the difference in voltage of the two bus sections is above a predetermined value.

17. In an electrical system, the combination with two bus sections, connecting means therebetween, a load circuit connected to each bus section, a supply circuit for each bus section and connecting means between each supply circuit and the corresponding bus section, of means responsive to the potentials of both bus sections for maintaining the connecting means between the two bus sections ineffective and the connecting means between each of the supply circuits and the corresponding bus section effective.

18. In an electrical system, the combination with two bus sections, connecting means therebetween, a load circuit connected to each bus section, a supply circuit for each bus section and connecting means between each supply circuit and the corresponding bus section, of means responsive to the potential of both bus sections and cooperating means responsive to the currents traversing both supply circuits for maintaining the connecting means between the two bus sections ineffective and the connecting means between each of the supply circuits and the corresponding bus sections effective.

In witness whereof, I have hereunto set my hand this 24th day of March 1926.

EDWARD H. HALL.